United States Patent [19]

Janson, Jr.

[11] Patent Number: 5,351,101
[45] Date of Patent: Sep. 27, 1994

[54] PHOTOGRAPHIC CAMERA AND FILM CARTRIDGE WITH DOUBLE EXPOSURE PREVENTION

[75] Inventor: Wilbert F. Janson, Jr., Shortsville, N.Y.

[73] Assignee: Eastman Kodak Company, Rochester, N.Y.

[21] Appl. No.: 115,283

[22] Filed: Aug. 31, 1993

[51] Int. Cl.⁵ .............................................. G03B 7/00
[52] U.S. Cl. ..................................... 354/21; 354/207; 354/275
[58] Field of Search ................. 354/21, 207, 275, 276; 242/71.1

[56] References Cited

U.S. PATENT DOCUMENTS

| | | | |
|---|---|---|---|
| 5,030,978 | 7/1991 | Stoneham et al. | 354/21 |
| 5,032,854 | 7/1991 | Stoneham et al. | 354/21 |
| 5,047,794 | 9/1991 | Pagano et al. | 354/275 |
| 5,115,268 | 5/1992 | Kitagawa et al. | 354/275 |

Primary Examiner—Howard B. Blankenship
Attorney, Agent, or Firm—Francis H. Boos

[57] ABSTRACT

A photographic film cartridge has one or more resistive elements formed on the exterior surface of the cartridge with associated visual indicator elements to indicate exposure status of film in the cartridge. The camera is provided with a drive circuit to change the resistance values of the resistive elements to provide an electrically sensed indication of the film exposure status when next the cartridge is placed in the camera. Provision can be made for both full exposure and mid-roll interrupt indications. At the same time, the heat generated by the resistive element during its change in resistance value is useful to change a characteristic of the associated visual indicator to provide a visual indication of the exposure status of the film in the cartridge.

10 Claims, 3 Drawing Sheets

PHOTOGRAPHIC CAMERA AND FILM CARTRIDGE WITH DOUBLE EXPOSURE PREVENTION

FIELD OF INVENTION

This invention relates to the field of photographic film cameras and film cartridges therefor with provision for double exposure prevention.

BACKGROUND

Conventional 35 mm film cartridges are normally sold with a portion of the film leader projecting from the exit slot of the cartridge. This allows the camera user to grasp and pull the film for loading in the camera and at the same time provides a visual indication to the camera user that the film in the cartridge is unexposed. Upon rewind, the film is rewound completely into the cartridge and the absence of the protruding leader indicates that the film has been exposed and prevents re-use of the film in a camera thus inherently providing protection against double exposure of the film. Recently, camera and film cartridge designs have been proposed in which the film is totally enclosed in the cartridge when sold. To load the film, the cartridge is inserted and the drive motor operates to thrust the film out of the cartridge to the film take-up spool. Upon rewind, the film is drawn entirely into the cartridge. As a consequence, there is no visual indication to distinguish between an exposed and an unexposed film roll and, thus, numerous camera and cartridge designs have been proposed to provide protection against re-use and double exposure of the film.

It is known, for example, to provide cartridges with mechanical features that cooperate with feelers in the camera that prevent insertion of cartridges into the camera when the film has previously been exposed. In many cases these mechanical features also provide a visual indication of the exposed condition of the film. A representative example of an arrangement providing both visible indication and mechanical lockout means is found in commonly assigned U.S. Pat. No. 5,047,794. U.S. Pat. No. 5,115,268 discloses a mechanical slide on the film cartridge is movable by a cam arrangement upon insertion into the camera to cover the letters UN in the word UNEXPOSED printed on the end of the cartridge to provide a visible indication of an exposed condition of the film in the cartridge. In commonly assigned U.S. Pat. No. 5,032,854 and 5,030,978, a radial bar coded disc on the end of a film cartridge is sensed by an opto-sensor in the camera to position the film spool upon conclusion of rewind at a selected one of plural visual indicators that indicate the exposure condition of film in the camera.

Such arrangements however, require special cartridge designs that add to the cost and complexity of cartridge manufacture. In the case of cartridges with just visual indicators, it is possible to ignore the indicators and load the film into the camera thereby creating a possibility of double exposure of the film.

In commonly assigned co-pending application Ser. No. 08/033,668-Lawther, entitled "Photographic Camera and Film Cartridge with Double Exposure Prevention", word, such as "UnExposed" is imprinted on the side of the cartridge with a normally transparent, thermally responsive material overlying the letters "Un". The cartridge is designed for use in a camera provided with an electrically actuatable heater in the cartridge receiving chamber that is aligned with the thermally responsive material and when the heater is activated upon taking of at least one exposure in the camera, the thermally responsive material is darkened leaving the word "Exposed" as a warning to the user not to reload the cartridge into a camera. A photo detector in the camera senses the opaque condition of the thermally responsive material and sends a signal to the camera controller to prevent loading of the film into the camera. While simpler than the mechanical arrangements described above, it still requires a relatively costly camera design with interface components to activate the thermally responsive material and optically sense the opaque condition of the material.

It is therefore an object of the invention to provide a simple, inexpensive cartridge and camera configuration that provides both a visual indication to the camera user of the exposure condition of photographic film in the cartridge and that also provides the capability of automatically preventing loading of exposed film into the camera to thereby avoid the possibility of double exposing the film in the camera. Moreover, it is an object of the invention to provide a cartridge and camera arrangement with the aforementioned advantages that does not require special, costly interface components in the camera cartridge receiving chamber.

SUMMARY OF THE INVENTION

In accordance with one aspect of the invention, there is provided a photographic film cartridge having a housing with an outer surface and having provision thereon for indication of the usage condition of film in the cartridge in which the film cartridge comprises resistance means on the outer surface of the cartridge including at least one resistive element formed of a material normally having a first resistance value, the material being responsive to an applied electrical stimulus to change to a second resistance value to indicate a predetermined change in usage condition of film in the cartridge. The cartridge further comprises terminals on the outer surface thereof in electrical contact with the resistive element and adapted to engage a detector circuit and a power supply circuit in a photographic film camera, the power supply circuit being effective to change the resistive element from first to second resistance values in response to a change in usage condition of the film and the detector circuit being responsive to detected resistance values of the resistive element to provide predetermined control effects in the camera depending on the detected resistance value, whereby the resistive element provides an electrically detectable indication of the film usage condition for control purposes in the camera.

In accordance with a further aspect of the invention, there is provided a photographic film camera having a chamber for receiving a film cartridge having a resistive element on the outer surface of the cartridge, the resistive element being formed of a material normally having a first resistance value and being responsive to an applied electrical stimulus to change to a second resistance value indicating a change in usage condition of film in the cartridge, the cartridge having electrical contacts connecting with the resistive element. The camera comprises electrical contacts in the chamber adapted to engage the contacts on the cartridge and detector circuit means for detecting the resistance value of the resistive element on the cartridge. The camera further comprises control means for controlling the loading of film in the camera in dependence on the detected resistance value of the resistive element and means including a power supply circuit for providing an electrical stimulus to the resistive element to change the resistance value in response to a predetermined change in the usage condition of the film in the camera.

Such an arrangement of the camera and the cartridge has the advantage being a simple, low cost double exposure prevention arrangement that does not involve costly mechanical features in the cartridge and camera and that simultaneously provides both a visual exposure indication and automatic prevention of loading of exposed film into the camera.

DETAILED DESCRIPTION

Figure 1:
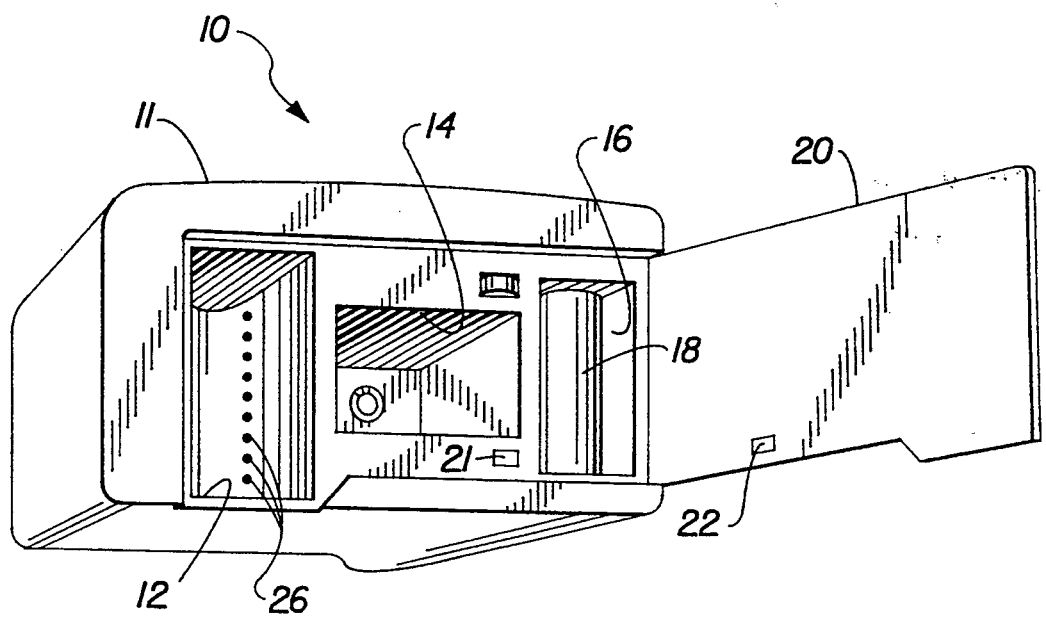
FIG. 1 is a perspective view of a photographic camera according to the invention.

Referring now to FIG. 1, a camera 10, in which one aspect of the present invention is embodied, is comprised of a camera body 11 and a hinged back cover 20. Camera body 11 is conventionally provided with a film cartridge receiving chamber 12, a film frame exposure aperture 14, film take-up chamber 16 and film take-up spool 18. Perforation sensing means for film metering in the camera may comprise a light emitting LED 21 mounted in the camera body 11 adjacent exposure aperture 14 and a light sensor 22 mounted on camera back 20 such that when back 20 is closed sensor 22 is aligned with LED 21. A film drive motor 52 (FIG. 4) is mounted within camera body 11 and variously coupled to drive the spool of a film cartridge in chamber 12 or the take-up spool 18 to perform well known film loading, winding and rewinding functions in the camera 10. A series of electrical contact terminals 26 are positioned on the curved surface of cartridge receiving chamber 12. Terminals 26 may be of the type conventionally found in cameras adapted to sense DX codes imprinted on the sides of a film cartridge for the purpose of inputting data to the camera concerning characteristics of the film in the cartridge.

Figure 2:
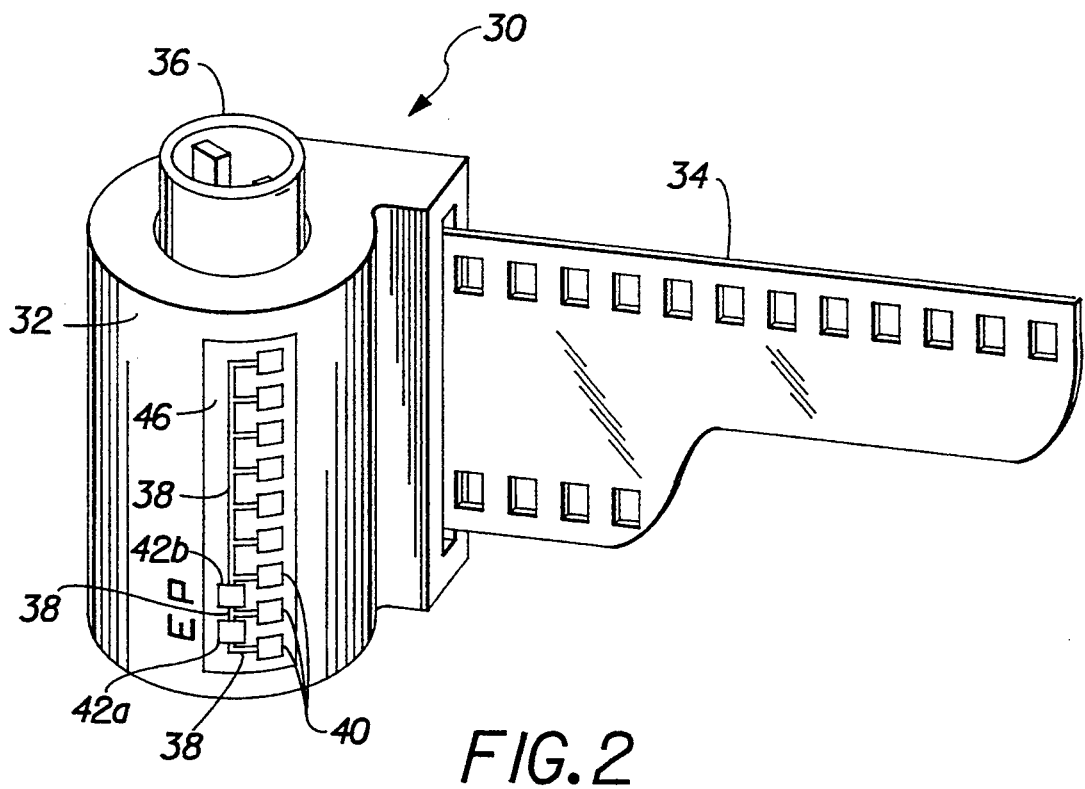
FIG. 2 is a perspective view of a film cartridge embodying one aspect of the present invention.

Referring to FIG. 2, there is shown a film cartridge 30 comprising a generally cylindrical housing 32 enclosing a roll of film 34 wound on an internal spool having an end drive spindle 36 extending out one end of the cartridge. In accordance with a particular feature of the invention, the cartridge is provided with resistance means on the outer surface of the cartridge comprised of one or more resistive elements 38 formed of a material normally having a first resistance value and responsive to an applied electrical stimulus to change to a second resistance value. An example of a material suitable for this purpose is a carbon or silver based resistive material identified as Conductive Silver Ink 2512 produced and sold by Metech, Inc. of Elverson, Pa. The carbon based version from the same supplier is identified as Flexible Carbon Conductor 2513. Typically, with low applied sensing currents, such materials have negligible first resistance value per square unit value of area for a given thickness. With a higher applied current, the material exhibits a transition to a second higher resistance value, potentially reaching an open circuit condition. Alternatively, similar effects can be achieved using a vapor deposited aluminum metal on polystyrene film. As will be seen, this second resistance value is useful to indicate a predetermined change in usage condition of film in the cartridge.

Figure 3:
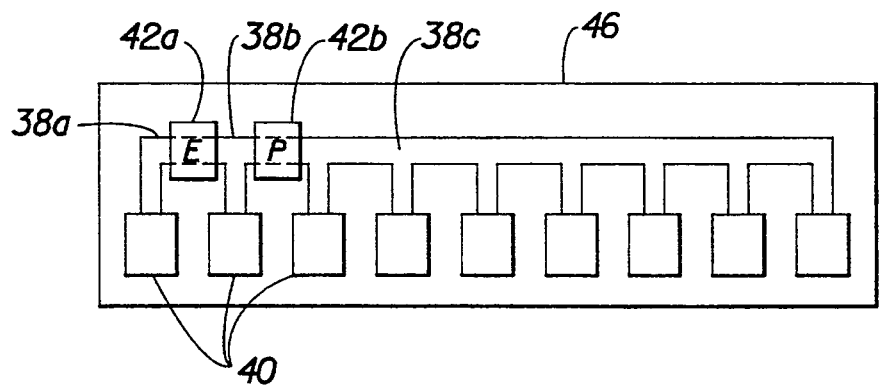
FIG. 3 is a is diagrammatic representation of a label for the outer surface of a film cartridge illustrating a feature of the invention.

The cartridge further includes a plurality of terminals 40 on the outer surface of the cartridge in electrical contact with the one or more resistive elements 38. The terminals 40 on the cartridge are adapted to be aligned with and make electrical contact with the terminals 26 in the camera cartridge receiving chamber. One or more thermo-responsive visual indicator elements 42 are coated over discrete ones of the resistive elements 38. These visual indicator elements are preferably formed of a material adapted to change a visual characteristic thereof in response to an increase of heat emitted from the underlying resistive element during the change of resistance value of the resistive element. The visual indication may take the form of changing the color of the material, such as from green to red, or it may be a change of optical density from opaque to clear. An example of a suitable material for this purpose would be a material sold under the name Thermax Irreversible Temperature Indicating Inks produced and sold by Thermographic Measurements, Inc. of Anaheim, Calif. These materials have the property of changing color in response to applied heat. An alternative preferred embodiment is a material produced and sold by the same company under the name Thermax Irreversible Indicators. These indicators are comprised of a colored substrate overcoated with an opaque specific melt material that melts in response to applied heat and is absorbed into the substrate. In the case of the latter indicator the colored substrate may comprise a printed letter to provide additional indication of the film usage condition. For example, as seen in FIG. 3, the letter "E" may be printed underneath an element so that when exposed it would indicate that the film in the cartridge is fully exposed. Another visual indicator might have the letter "P" printed underneath so that, when exposed, it would indicate that the film is partially exposed in the cartridge. Alternatively, the letters could be printed adjacent the elements as shown in FIG. 2. The resistive elements, contact terminals and visual indicator elements may be coated or printed directly onto the outer surface of the film cartridge or they may be coated or printed onto a flexible substrate so as to form a label 46 that could be adhesively applied to the cartridge surface at a suitable stage in the film cartridge production and film loading process.

Figure 4:
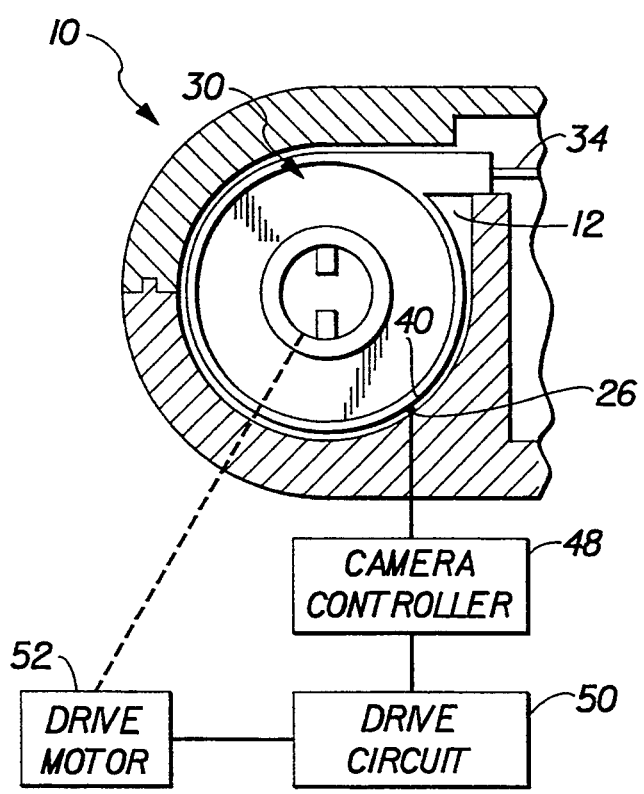
FIG. 4 is a schematic diagram of a portion of a camera and related circuits constructed according to the invention.

Referring to FIG. 4, contact terminals 26 in the camera receiving chamber are connected to a camera controller 48 to provide suitable inputs to the controller. The camera controller is connected to a motor drive circuit 50 used to drive the camera drive motor 52 to control film drive operations in the camera.

Figure 5:
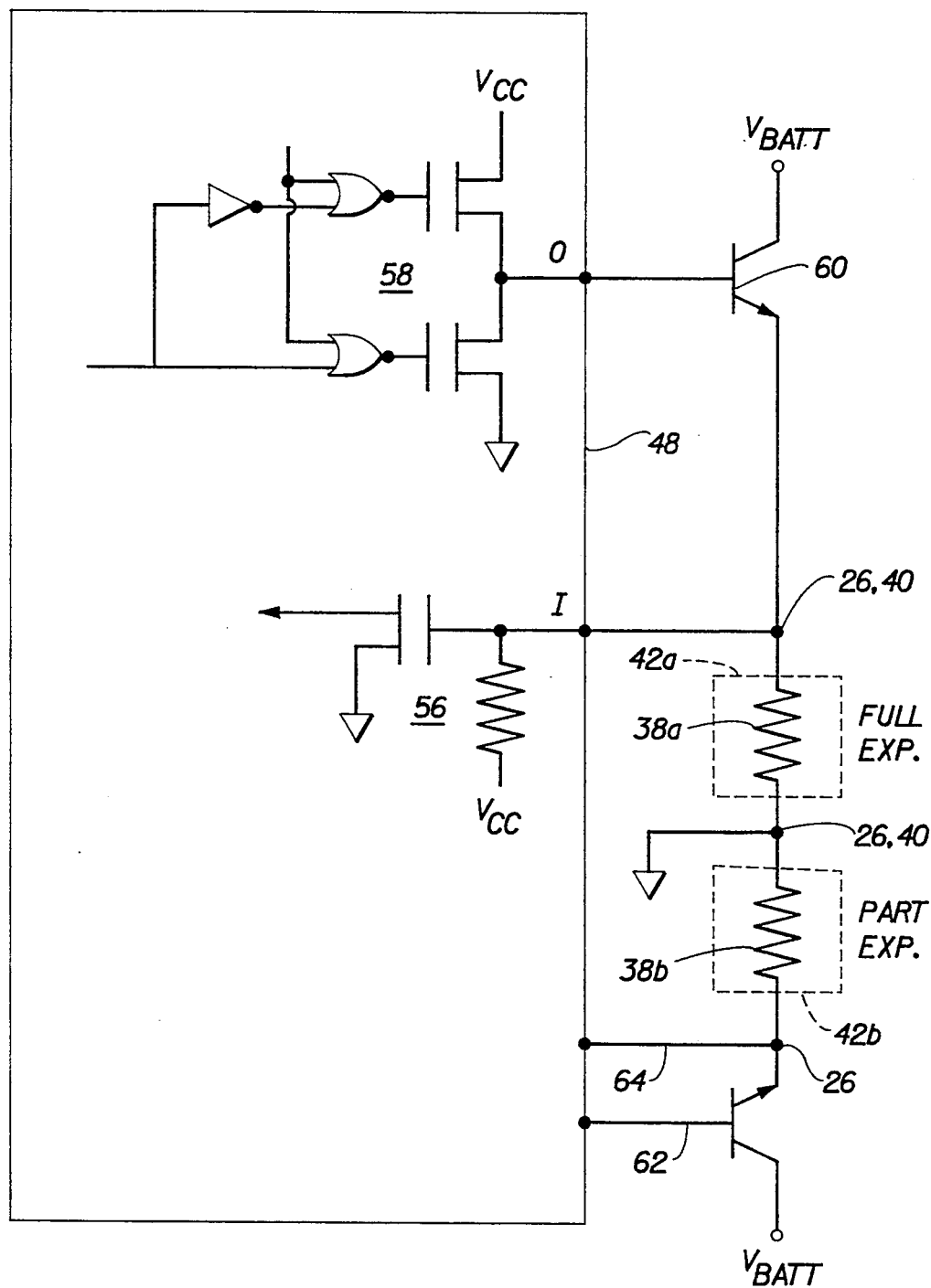
FIG. 5 is schematic circuit diagram of the camera circuits and cartridge circuit elements according to the present invention.

In FIG. 5, there is shown, schematically, the electrical circuit formed by the resistive elements 38a, 38b on the cartridge 30 and associated input and output circuits 56,58, respectively, the latter being typically found in camera controller 48. When the film cartridge is loaded into the camera, the two electrical contract terminals 40 connected to the resistive element 38a under the fully exposed film condition indicator 42a are respectively connected on one side of the element to ground and, on the other side, jointly to a controller input circuit 56 and to the emitter of a normally off switching transistor 60. The collector of transistor 60 is connected to a battery normally found in an electronically controlled camera. The base of transistor 60 is connected to an output circuit 58 in the controller 48.

In operation, when the film cartridge 30 with previously unexposed film is loaded into the camera, the resistance of resistive element 38a is at its normal low value and the ground potential applied to the controller input circuit 38a allows the drive motor to load the film into the camera. When the film is fully exposed in the camera, the output circuit 58 is caused to output a low condition to the base of transistor 60 thereby driving transistor 60 to conduction and applying the positive battery potential to resistive element 38a. The nature of the material used for the resistive element 38a is such that the relatively high battery-induced current through the material is sufficient to cause the resistance of the material to change substantially. It might rise to a high level or could even be driven to an open circuit condition in a manner similar to the operation of a fuse link. Either way, the heat generated in resistive element 38a during the momentary change in resistive value causes the thermo-responsive material of visual indicator element 42a to respond with either a color change or a change in density, depending on the nature of the material. If, despite the existence of the visual indication, the cartridge were to be inadvertently re-inserted into the camera, the high or open circuit resistance value of the resistive element 38a would cause a high level input from the internal source $V_{cc}$ to be sensed by input circuit 56, resulting in the sending of a signal to controller 48 indicating that the film in this cartridge is fully exposed. The suitably programmed controller would then cause loading of the film to be inhibited, thus preventing double exposure of the film.

If the camera is mid-roll interrupt capable, when the user initiates rewind of the film prior to fully exposing all the frames on the film, controller 48 sends an output on line 62 to cause the resistive element 38b to change its resistance value in the same manner as described above. When the film cartridge is reinserted into the camera at a later time, the changed resistance value of element 38b is sensed by the input circuit on input line 64 and the controller is programmed to initiate loading of the film so as to place the next available unexposed frame in the camera exposure aperture. The manner in which mid-roll reloading is performed is well known and further description is unnecessary since the details thereof are not within the scope of the present invention.

It will be appreciated from the foregoing that what is has been disclosed is a simple and reliable camera and film cartridge arrangement to both manually, by visual indication, and automatically, by resistance sensing, prevent double exposure of film that does not require costly mechanical features in the cartridge or camera design. The invention has been described in detail with particular reference to a presently preferred embodiment, but it will be understood that variations and modifications can be effected within the scope of the invention as set forth in the claims appended hereto.

In the accompanying drawings, the following reference numerals are used:
10 camera
11 camera body
12 cartridge receiving chamber
14 film frame exposure aperture
16 film take-up chamber
18 film take-up spool
20 camera back
21 LED
22 light sensor
26 electrical contact terminals
30 film cartridge
32 cartridge housing
34 film
36 spool end drive spindle
38 resistive elements
40 electrical contact terminals
42 visual indicator elements
46 label
48 camera controller
50 motor drive circuit
52 drive motor
56 controller input circuit
58 controller output circuit
60 transistor
62 controller output line
64 controller input line

We claim:

1. Film cartridge having a housing with an outer surface and having provision thereon for indication of the usage condition of film in the cartridge, the cartridge comprising:
   resistance means on the outer surface of the cartridge including at least one resistive element formed of a material normally having a first resistance value, the material being responsive to an applied electrical stimulus to change to a second resistance value to indicate a predetermined change in usage condition of film in the cartridge; and
   terminals on the outer surface in electrical contact with the resistive element and adapted to engage a detector circuit and a power supply circuit in a photographic film camera,
   whereby the resistive element provides an electrically detectable indication of the film usage condition for control purposes in the camera.

2. The film cartridge of claim 1 further including a thermo-responsive visual indicator element overlying the resistive element and formed of a material adapted to change a visual characteristic thereof in response to an increase of heat emitted from resistive element during change in resistance of the resistive element,
   whereby the indicator element provides a visual indication of a predetermined usage condition of the film in the cartridge.

3. The cartridge of claim 1 wherein the resistance means includes separate first and second resistive elements coupled to separate electrical terminals adapted to connect to separate pairs of power supply and detector circuits in a camera, wherein the first element corresponds to a first usage condition in which all frames of the film have been exposed and the second element corresponds to a second usage condition in which the film has been unloaded into the camera but rewound without all frames having been exposed.

4. The cartridge of claim 3 wherein each resistive element has an associated thermo-responsive visual indicator overlying the element formed of a material adapted to change a visual characteristic thereof in response to an increase of heat emitted from the associated resistive element during change in resistance of the resistive element, whereby separate visual indications are given for each of the first and second usage conditions of the film in the cartridge.

5. The film cartridge of claim 1 wherein the resistive element normally has a low resistance value and is responsive to an applied electrical stimulus to permanently change to a high resistance value.

6. The cartridge of claim 1 in which the resistive element is a fusible link and the high resistance value is an open circuit.

7. The cartridge of claim 2 wherein the visual indicator is normally opaque and is adapted to change to a clear visual characteristic upon application of heat from the resistive element.

8. The cartridge of claim 2 wherein the visual indicator is normally a first color and is adapted to change to a second color upon application of heat from the resistive element.

9. A photographic film camera having a chamber for receiving a film cartridge having a resistive element on the outer surface of the cartridge, the resistive element being formed of a material normally having a first resistance value and being responsive to an applied electrical stimulus to change to a second resistance value indicating a change in usage condition of film in the cartridge, the cartridge having electrical contacts connecting with the resistive element, the camera comprising:

electrical contacts in the chamber adapted to engage the contacts on the cartridge;

detector circuit means for detecting the resistance value of the resistive element;

control means for controlling the loading of film in the camera in dependence on the detected resistance value of the resistive element; and means including a power supply circuit for providing an electrical stimulus to the resistive element to change the resistance value in response to a predetermined change in the usage condition of the film in the camera.

10. The camera of claim 9 wherein the cartridge includes first and second separate resistive elements, and the camera includes first and second pairs of detector and power supply circuits adapted to be separately coupled with said first and second resistive elements on the cartridge, said first pair of power supply and detector circuits being associated with one of the resistive elements to indicate exposure of all image frames on the film in the cartridge and the second pair of power supply and detector circuits being associated with the other of said resistive elements to indicate exposure of less than all of the image frames on the film in the cartridge.

* * * * *